United States Patent [19]

Young

[11] 3,749,846

[45] July 31, 1973

[54] RING TRIP CIRCUIT

[75] Inventor: John S. Young, Addison, Ill.

[73] Assignee: GTE Automatic Electric Laboratories Incorporated, Northlake, Ill.

[22] Filed: June 8, 1972

[21] Appl. No.: 260,842

[52] U.S. Cl. .......................... 179/84 R, 179/18 HB
[51] Int. Cl. .......................................... H04m 3/02
[58] Field of Search ...................... 179/18 HB, 84 R

[56] References Cited

UNITED STATES PATENTS 3,683,118 8/1972 Vago et al. .................... 179/84 R X

*Primary Examiner*—William C. Cooper
*Attorney*—K. Mullerheim, L. N. Arnold et al.

[57] ABSTRACT

A ring trip arrangement for a ringing circuit including a ring trip relay having dual winding coils, rectifying means and capacitive means arranged in two series-shunt circuit combinations. Each of these circuit combinations exhibit under alternating current flow conditions substantially equal and offsetting electrical parameters including subtracting electromagnetic flux fields to maintain an inoperative energization state for the relay. Under direct current flow conditions, balanced flux fields of the relay coils are upset and the ring trip relay is operated.

7 Claims, 3 Drawing Figures

RING TRIP CIRCUIT

BACKGROUND OF THE INVENTION

This invention relates to communication switching systems, and more particularly, relates to a ring trip arrangement for removing ringing current from the called line.

In a telephone transmission network connecting through exchange equipment the subscriber stations of calling and called parties, there is provided means for intermittently ringing the called station through a ringing circuit having a ring trip arrangement operative to abruptly halt ringing current upon the occurrence of an answered off-hook response. It is common practice to include this ringing circuit and its ring trip arrangement as a part of the exchange equipment. Ring trip arrangements must necessarily be generally fast-acting and highly sensitive so as to remove the ringing current from the called station before objectionable cross ringing occurs. Furthermore, multi-party lines being simultaneously signaled sometimes present a relatively large magnitude of ringing current which can cause premature or false operation of the ring trip arrangement. Direct current faults within the system may also cause false operation of the ring trip arrangement.

Ring trip arrangements usually employ relays as the tripping device and one such relay trip circuit is disclosed in U.S. Pat. No. 3,160,714, issued Dec. 8, 1964, assigned to the assignee of the present invention, and to which the reader is referred for a more detailed discussion. This referenced trip circuit employs a transformer to maintain two windings of a relay coil in a de-energized state by means of balanced electromagnetic flux fields, which balance is upset upon the flow of direct current through one of the windings to operate the relay. This is a desirable means of accomplishing the operation of the ring trip relay but is cumbersome in the use of an expensive transformer which is not economical nor readily adaptable to being mounted on a printed circuit board. In general, the prior art relays utilized for ring trip functions have been relatively bulky, slow-acting and susceptible to false trip due to their circuit employments. In view of the popularity of closely-spaced printed card files within telephone equipment frames, it is a desirable feature to provide an improved ring trip circuit which is miniaturized, fast-acting, highly sensitive to the proper magnitude of tripping current, economical and which guards against premature trip operation.

SUMMARY OF THE INVENTION

It is therefore an object of the present invention to provide a ring trip arrangement which is simple in its operation and economical to construct and is sensitive and fast-acting for disconnecting ringing current before objectionable cross ringing occurs. It is another object of the invention to provide a ring trip relay which can tolerate large alternating current to ringing loads without premature trip operation through the use of balanced electromagnetic flux fields within the winding of the relay coil. It is still another object to provide a ring trip arrangement utilizing presently available components which are capable of being closely mounted on a printed circuit board.

A station connectible ringing circuit for a communication switching system is traversed during ringing intervals by alternating current only and traversed when the ringing is answered by direct current as well. The ringing circuit includes among other components a ring trip arrangement comprising a relay having two windings, a pair of rectifying means and a pair of capacitive means. The pair of rectifying means are connected in series with the two windings, respectively, for conducting unidirectional currents therethrough during opposite half cycles of said alternating current. The pair of capacitive means are connected in parallel with the two windings and in series with the pair of rectifying means, respectively, for providing a charge storage action during the conduction of said associated rectifying means and further providing unidirectional current flowing through the associated winding when the other rectifying means is conducting unidirectional current through its associated winding. The unidirectional currents flow through the two windings during each half cycle of alternating current in opposite directions for maintaining substantially off-setting electromagnetic flux fields between the two windings so that the relay is maintained in an inoperative state. When the ringing circuit is traversed by direct current as well, a selective one of the rectifying means is conductive of the direct current component for causing the substantially equal flux fields to become unbalanced thereby to operate the relay and trip the ringing circuit.

Other objects and advantages of the invention will occur to those skilled in the art as the invention is described in connection with the accompanying drawing in which:

DETAILED DESCRIPTION

Figure 1:
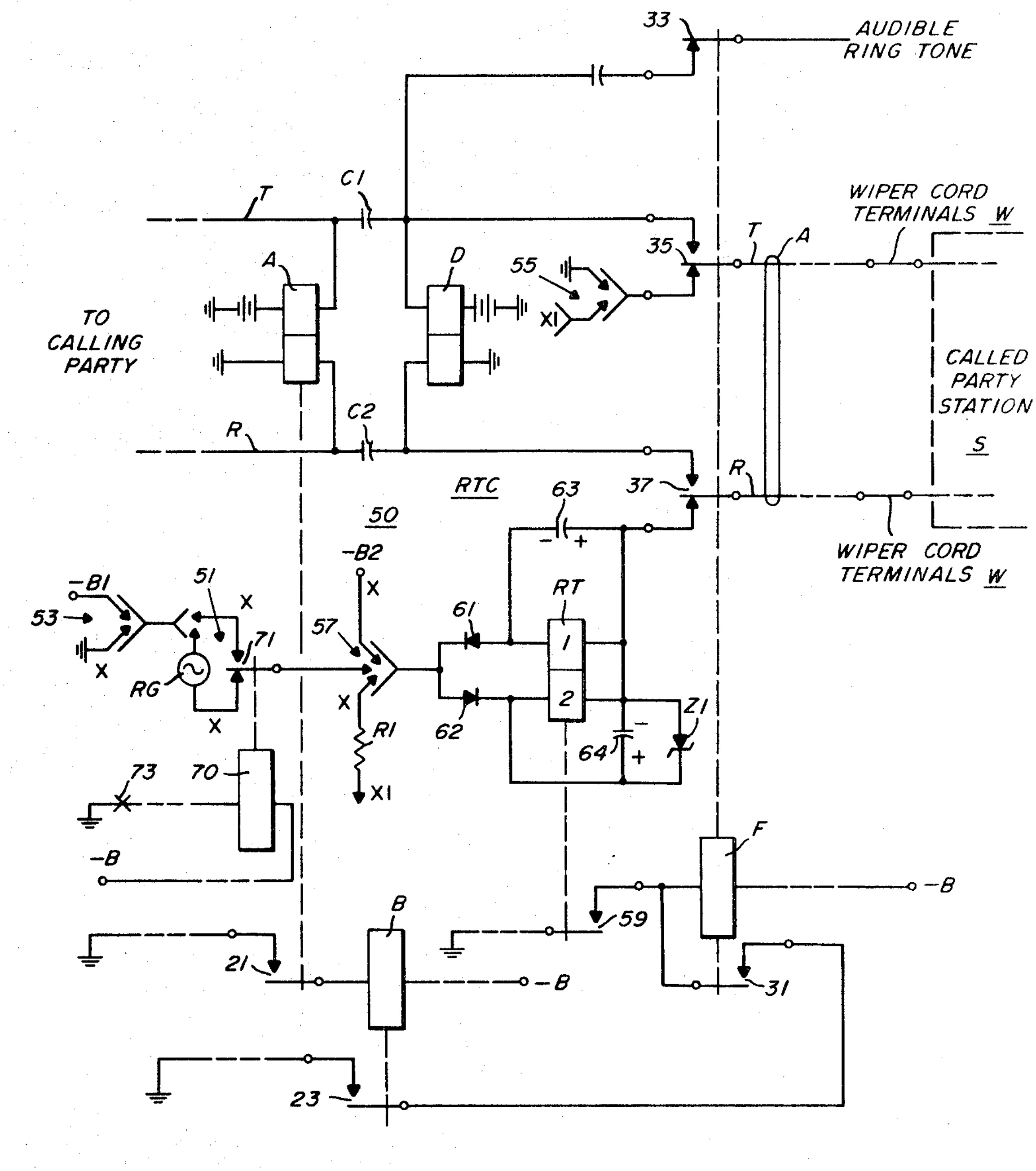
FIG. 1 is a schematic representation of a ringing circuit employing the ring trip arrangement of the present invention and being shown in use with essentially an electromechanical switching system.

FIG. 1 is representative of an electromechanical type communication switching system which shows a loop circuit A to be completed to a called party station S and being comprised of well knwon equipment such as relay A supplying exchange battery to the calling party, d.c. isolating line capacitors C1 and C2, relay D supplying exchange battery to the called party, and the tip T and ring R line conductors. As commonly understood, the calling party dials the desired telephone number and the dialed code controls the relay A to energize the same whereupon a holding relay B is energized through normally opened contacts 21 associated with the relay A. The energization of the relay B then closes its associated normally opened contacts 23 to prepare a locking circuit for the later activation of a relay F. The dialed code causes the wiper cord terminals to select from a number of possible selections the terminals W of the desired called party station S.

As shown in FIG. 1, the relay F has the following contacts, namely: normally opened contacts 31 and normally closed ocntacts 33, 35 and 37 when the relay F is inoperative. Contacts 33 supply audible ring tone to the calling party to indicate that the status of the calling party station S is idle and that ringing current is being applied. Contacts 35 and 37 connect the tip T and ring R lines to a ringing circuit 50 which applies alternating ringing current to the station S in a particular manner to be hereinafter described. This invention presents a novel ring trip arrangement or circuit RTC which is used to remove the ringing circuit 50 from the loop circuit A through the energization of the relay F which alters the position of the contacts 35 and 37 to make with the open contacts shown in FIG. 1. Relay F is energized through the closure of normally opened contacts 59 controlled by the ring trip arrangement RTC and is then held in its energized state by the closure of its normally opened contacts 31 due to the earlier energization of the holding relay B.

The ringing circuit 50 is generally comprised of a signaling-interrupter means 51 including an alternately connectible ringing generator RG and a direct switch-through path and the ring trip arrangement RTC. According to conventional practice, the ringing generator RG is applied to the loop circuit A for a relatively short time period (approximately 2 seconds) and then interrupted for a longer time period (approximately 4 seconds for the silent period) before being cylically reapplied. Also, it is known to alternatively connect the signaling-interrupter means 51 to either a ground potential or to a ringing battery source B1 as is the usual practice.

Now in accordance with the present invention, the ring trip arrangement RTC is comprised of a ring trip relay RT having two individual windings 1 and 2 which may be conveniently wound on the same core structure to constitute a single relay coil. Further, a pair of rectifying means in the form of general purpose silicon diodes 61 and 62 are connected in electrical series with the two windings, respectively. As shown in FIG. 1, the diodes 61 and 62 are oppositely poled with respect to each other, that is to say, their forward bias configurations are connected in the circuit to pass and oppose the opposite half cycles of the alternating ringing current applied during the ringing interval from the ringing generator RG, respectively. A pair of capacitive means in the form of capacitors 63 and 64 are connected in electrical parallel with the two windings, respectively, and in electrical series with the two diodes 61 and 62, respectively. Because of the splitting current flow action of the diodes 61 and 62, the capacitors 63 and 64 may be bipolar capacitors protected from reverse voltage bias.

Before discussing the detailed operation of the ring trip arrangement RTC, several more comments are needed to explain the ringing circuit 50. There is shown in FIG. 1 a relay at 70 which controls through its contacts 71 the alternate connections between the ringing and silent intervals. At 73 there is shown a make contact which should be understood to be alternately made for energizing the relay 70 and thereby applying ringing current and broken for releasing the contacts 71 to thereby interconnect to the direct switchthrough path instead. Also, when the signaling-interrupter means 51 in either position of the contacts 71 are connected to the ringing battery B1, alternate contact sets at 53, 55 and 57 are made in turn from the battery B1 to ground potential through the ring trip arrangement RTC. When the signaling-interrupter means 51 in either position of the contacts 71 are connected to ground potential at the alternate contact set 53, the alternating ringing current is switched at contact set 57 through a protecting resistor R1 onto the T line at alternate contact set 55 (indicated by the X1—X1 connection points) thereafter from the R line through the ring trip arrangement RTC and to a negative exchange battery B2 via the alternate contact set 57. In FIG. 1, the X designations indicate common paths when operating in the grounded mode for the signaling-interrupter means 51.

Now turning to the operation of the ring trip arrangement RTC, during ringing intervals irrespective of whether the signaling-interrupter means 51 is directly connected to battery or ground potential, the negative half cycles of alternating current are conducted by the diode 61 and thereafter the current is divided between the winding 1 of the trip relay RT and the capacitor 63 according to known electrical principles. The capacitor 63 is thereby successively charged during reoccurring negative half cycle periods to its capacitive rating and then discharges during the positive half cycles of alternating current during which time the diode 61 is nonconductive.

Moreover, the positive half cycles of alternating current are conducted by the diode 62 and the positive current divided between the winding 2 of the relay RT and the capacitor 64. The capacitor 64 is thereby successively charged to its capacitive rating, and then discharges through its associated winding 2 during the negative half cycles of alternating current. Each of the associated ones of the diodes 61 and 62, capacitors 63 and 64 and relay windings 1 and 2 form a series-shunt circuit combination, the resulting two series-shunt circuit combinations themselves being connected in electrical parallel.

The windings 1 and 2 of the trip relay RT have substantially equal resistances and approximately the same number of turns or convolutions to comprise the winding for providing under equal conducting current conditions the same magnitude of ampere-turn sensitivity. The general purpose silicon diodes 61 and 62 are selected to have substantially equal electrical parameters as are the capacitors 63 and 64. The capacitor 63 and the relay winding 1, and the capacitor 64 and the relay winding 2, combine to comprise shunt loop circuits which have an RC time constant of a duration in the order of three times the duration of a half cycle period of the alternating current.

The reason which dictates providing the longer duration of RC time constant relates to the capability of the ring trip arrangement to maintain substantially equal and off-setting electrical or electromagnetic flux fields between the windings 1 and 2 so as to prevent the operation of the ring trip relay RT. It is according to the principles of the present invention to provide a charge storage action in one shunt loop circuit while in the other shunt loop circuit the capacitor is being discharged through its associated relay winding. There is then presented during any given half cycle time period, unidirectional pulsating currents flowing in opposite directions through the windings 1 and 2 to create substantially equal and subtracting electromagnetic flux fields in the windings whereby the relay coil is not energized to a sufficient flux level for operating its associated contact 59.

The ring trip relay RT has been chosen for its capability to accept a certain voltage differential between its windings without operating the relay, this capability being necessary because of the decay characteristics of the capacitors 63 and 64. It is apparent that one of the capacitors will charge while the other of the capacitors will discharge. If the discharging capacitor were permitted to discharge through its associated relay winding until it had reached a charge level substantially lower than its original charge level, the resulting flux field of its associated winding would have decayed to a point where the flux field could not successfully cancel out the effect of the building flux field of the parallel connected winding. The ring trip relay RT would then be operated during each half cycle time period of the alternating current. It is hence desirable to select the capacitive value of the capacitors 63 and 64 so as to provide the RC time constant of the shunt loop circuits to be relatively long in comparison to the duration of the half cycle time period.

Furthermore, the ring trip relay RT should be selected to have a relatively small magnitude of mutual coupling of its flux fields between the windings 1 and 2. This is for the reason that it is undesirable to have one building or expanding flux field which links with the opposite winding to thus oppose the building of the other flux field within that opposite winding. Theoretically, it would seem that with an equal amount of mutual coupling of one flux field with the other field that mutual coupling would not be a concern in selecting the ring trip relay RT because the two flux fields would continue to exhibit substantially equal and offsetting electromagnetic effects irrespective of the absolute values of their flux levels. However, in practice it is difficult to achieve a relay having exactly equal and opposing electromagnetic characteristics when connected in the present circuit, and it has been found to be desirable to choose a relay having small magnitudes of mutual couplings between windings.

The use of the splitting diode configuration in the ring trip arrangement RTC permits the use of bipolar capacitors for the capacitors 63 and 64, which bipolar capacitors present advantages of cost and mounting space over other types of capacitors. The diodes 61 and 62 provide reverse voltage protection for the capacitors 63 and 64, thus also tending to permit the use of bipolar capacitors. Additionally, the ring trip relay RT has been chosen to be a mercury wetted contact relay having dual windings and a single set of contacts. The mercury wetted relay is generally fast-acting and highly sensitive once the voltage differential between the windings 1 and 2 has reached the tripping level. Further, the mercury type relay RT is not operable upon the application of reverse voltage bias as it must be operated by forward current flowing through winding 1. If desired, a zener diode Z1 of a preselected voltage breakdown rating can be connected across the capacitor 64 for protecting it against excessive forward bias. It is to be noted that the same zener diode is not necessary to protect the capacitor 63 against excessive forward bias as the relay RT will operate to protect the capacitor 63. It is to be noted that the ring trip relay RT will not operate for large amplitudes of ringing currents as do some ring trip relays because the windings 1 and 2 remain at substantially equal and offsetting flux levels. Also, because of the degree of tolerance of flux field differential, the relay RT will not operate upon the occurrence of ground fault conditions creating direct currents unless the resulting direct currents are of an energizable magnitude.

Upon the called party station S responding to an off-hook condition, a direct current path is established through the subscriber's station apparatus in accordance with known telephony practice. Direct current is then superimposed upon the alternating ringing current. This direct current component will be conducted through the winding 1 of the ring trip relay RT while no corresponding direct current component will be conducted through the winding 2. The resulting net increase in current flow through the winding 1 will result in the energization of the relay RT as the respective flux fields are brought out of balance by an amount sufficient to trigger the relay RT. The trip relay RT operates quickly because of its high sensitivity to close its contacts 59, thus triggering the relay F, disconnecting the ringing circuit 50 and connecting the loop circuit A to the exchange relay D of the normal talking circuit. The operation of the relay F closes the contacts 31. The relay F is then locked in its energized state through a locking circuit path to ground potential through the previously made contacts 23 associated with the relay B. As noted the operation of the relay F will change the connections of the contacts 35 and 37 from those positions shown in FIG. 1 thus connecting the called party station S with the calling party.

Figure 2:
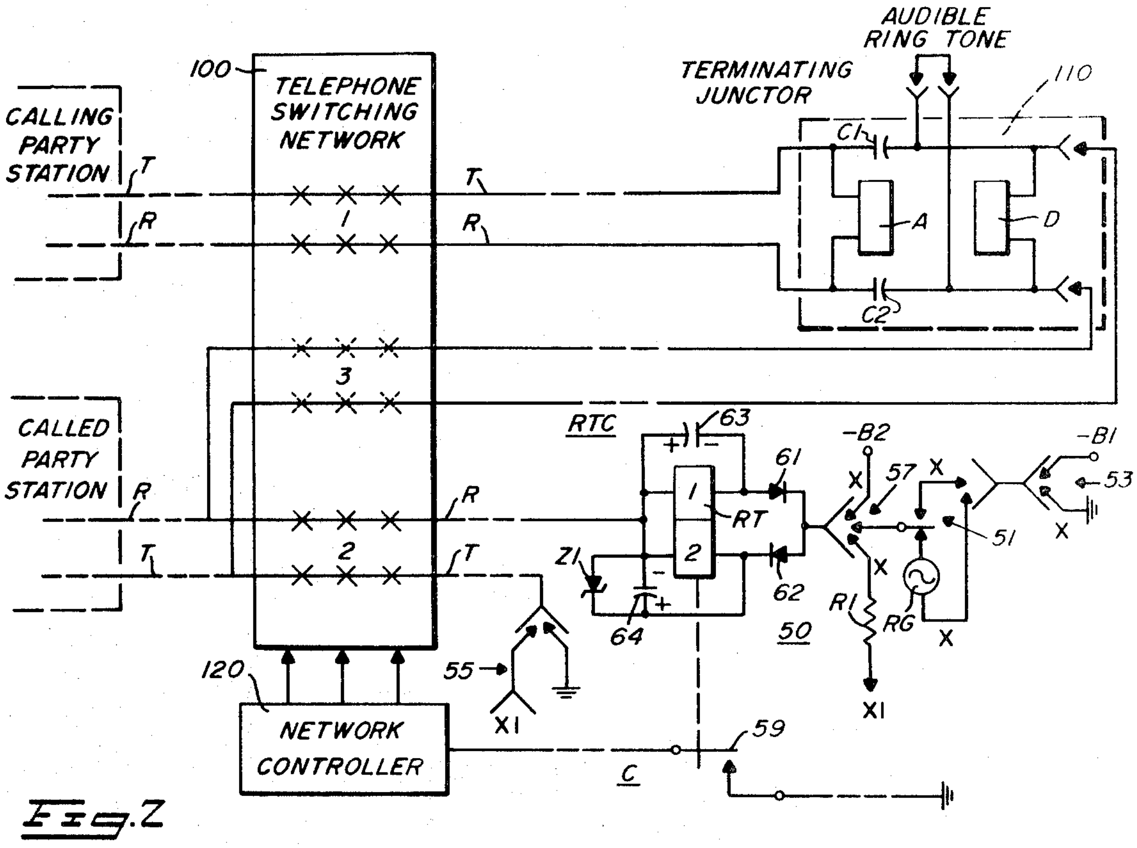
FIG. 2 is a schematic representation of the same ring trip arrangement being shown in use with essentially a stored program type switching system.

The ringing circuit 50 is equally useful in a stored program control type communication switching system and its application in this environment is shown in FIG. 2 wherein the same reference numerals and/or characters are used to identify identical parts. Referring now to FIG. 2, there is shown a calling party station connectible over T and R lines and trunks to a called party station through a telephone switching network 100 and a terminating junctor 110. The terminating junctor typically includes the relay A and the relay D used to supply exchange battery to the calling and called party stations, respectively. Upon the calling party station initiating the dialed code information which identifies the selected called party station, a stored program network controller circuit 120 causes a plurality of crosspoints within selected matrix groups to be connected as indicated at crosspoint matrix groups 1 and 2. The making of the cross point matrix group 1 connects the calling party to the terminating junctor 110 thereby supplying audible ring tone to the calling party station. The making of the cross-point matrix group 2 ocnnects the ringing circuit 50 to the called party station.

The operation of the ringing circuit 50 and the ring trip arrangement RTC thereof is the same as described above in connection with the electromechanical type communication switching system. Upon the ring being answered, a direct current path is established in the called party station which direct current component causes the relay RT to operate for closing the associated contacts 59. The contacts 59 constitute a sensing point for the stored program control since the making of contacts 59 complete a control circuit C extending to the network controller 120 whereby the network controller is instructed that the ring trip has occurred. Thereupon, the network controller 120 pursuant to its stored instructions causes the crosspoint matrix group 2 to disconnect and quickly thereafter establishes a make condition for a crosspoint matrix group 3 for connecting the called party station directly to the calling party station for establishing a talking circuit. It is not shown in FIG. 2 how the talking mode is taken down nor how the network connection is re-established to the ringing circuit 50 but it is to be understood that this function is within the performance capacity of the network controller 120.

Figure 3:
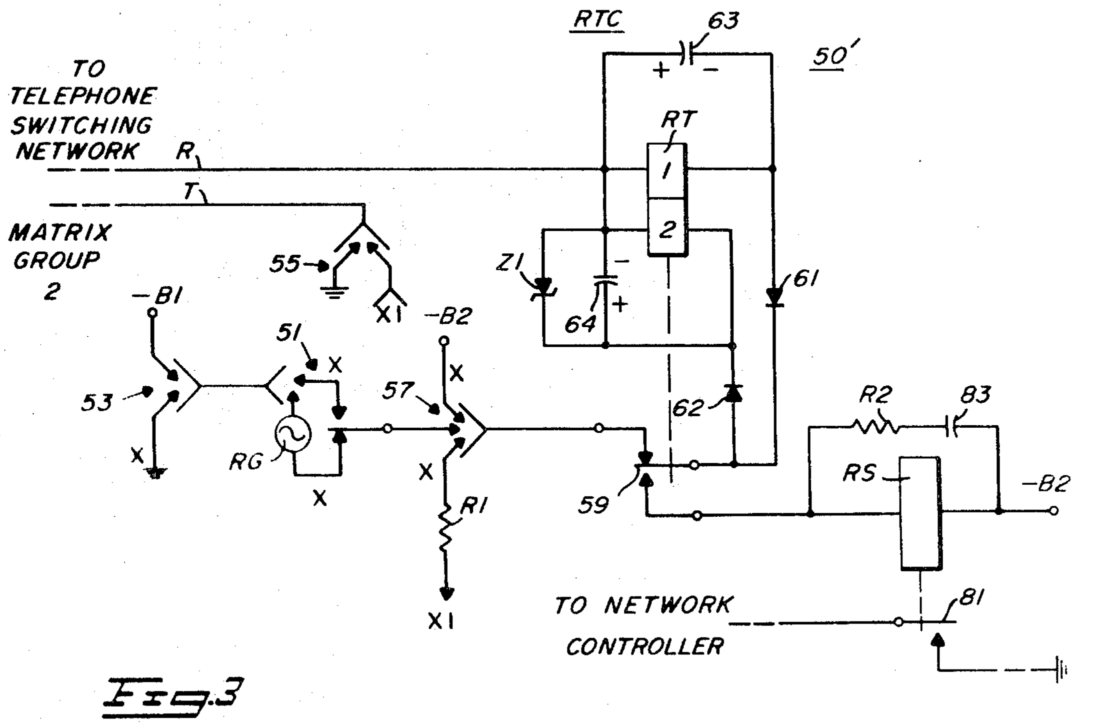
FIG. 3 is a schematic representation of an alternative ringing circuit useful with the stored program switching system of FIG. 2.

FIG. 3 shows an alternative ringing circuit 50' to be used in place of the ringing circuit 50 of FIG. 2. The ring trip arrangement RTC is the same as the RTC circuit of FIGS. 1 and 2; the signaling-interrupter means 51 is the same as well as are the alternate connections such that the same reference numerals and/or characters are again utilized to identify similar items. However, it is to be noted that the contacts 59 associated with the ring trip relay RT when operated, will directly disconnect the signaling-interrupter means 51 from the ring trip arrangement RTC and thusly from the called party station apparatus. This will protect against continuing to ring the station apparatus upon the occurrence of the off-hook response.

The energized ring trip relay RT causes the contacts 59 to close a path to the negative supply battery B2 through the winding of a slave or auxiliary relay RS. The slave relay RS upon its energization closes an associated normally open set of contacts 81 which in turn are used to comprise a sense point for the network controller circuit 120 of FIG. 2. The operating time of the slave relay RS introduces a slight time delay between the disconnection of the ringing generator RG from the called party loop circuit A and the signaling to the network controller circuit 120 that an answered condition has occurred. The operating time of the slave relay RS can be further slowed by connecting a resistor R2 and a capacitor 83 in shunt with the winding of the relay RS. The time delay is thought to be desirable where a false trip of the relay RT has occurred and it is desired to reconnect the ringing generator RG to the called party station apparatus without having signaled the network controller circuit 120 to take down the ringing matrix connections at 2 and establish instead the talking matrix connections at 3.

In one particular embodiment of the invention, a printed circuit board mounting was used and the selection of components were as follows, namely: the ring trip relay RT was selected to be a dual winding mercury wetted contact relay due to its high sensitivity and the small magnitude of mutual coupling between its two windings, each winding of which had an impedance of approximately 325 ohms and consisted of some 2,500 turns. The exchange battery was essentially a negative 48 volt supply; the alternating current supply could be either a 90 volt 20 Hz supply or a 145 volt 60 Hz supply. The loop load impedances were varied from some 300 to 3,000 ohms with corresponding trip or operate times of the ring trip relay ranging from 1.8 milliseconds to 130 milliseconds. The diodes were general purpose silicon devices and the capacitors were rated at approximately 250 mf with some 50 volts working voltage. The slave relay RS was chosen to be a single winding mercury wetted contact relay with an impedance of some 685 ohms with essentially 5,000 turns. The capacitor across the slave relay was rated at 50 mf with a 50 volt working voltage.

It is to be understood that while the present invention has been shown and described with reference to the preferred embodiments thereof, the invention is not limited to the precise forms set forth, and that various modifications and changes may be made therein without departing from the true spirit and scope of the present invention.

I claim:

1. In a communication switching system having a station connectible ringing circuit traversed during ringing intervals by alternating current only and traversed when the ring is answered by direct current as well, a ring trip arrangement comprising a relay having two windings, a pair of rectifying means connected in series with said two windings, respectively, for conducting unidirectional currents therethrough during opposite half cycles of said alternating current, a pair of capacitive means connected in parallel with said two windings and in series with said pair of rectifying means, respectively, for providing charge storage action during conduction of said associated rectifying means and further providing unidirectional current flowing through said associated winding when the other rectifying means is conducting unidirectional current through its associated winding, said unidirectional currents through said two windings during each half cycle of alternating current flowing in opposite directions for maintaining substantially off-setting electromagnetic flux fields between said two windings whereby said relay is maintained in an inoperative state, and when said ringing circuit is traversed by direct current as well, only one of said rectifying means is conductive of said direct current for causing said offsetting flux fields to become unbalanced whereby said relay device is operated and the ring is tripped.

2. A ring trip arrangement as claimed in claim 1 wherein associated ones of said capacitive means, rectifying means and said windings comprise two series-shunt circuit combinations, said two series-shunt combinations being connected in electrical parallel and have substantially equal electrical parameters.

3. A ring trip arrangement as claimed in claim 1 wherein said two windings of said relay have a relatively small magnitude of mutual coupling of flux fields to prevent the flux field of one of said windings from bucking the flux field of the other of said windings.

4. A ring trip arrangement as claimed in claim 1 wherein said relay is a first relay, said first relay includes at least a set of contacts having an armature connected to said two windings of said first relay for moving from a first contact position to a second contact position when said first relay is operated, said alternating current is supplied from ringing source means, said ringing source means being connected to said first contact position for providing the disconnection thereof with operation of said first relay, a second relay is provided having a winding connected to said second contact position for operating of said second relay with movement of said armature to said second contact position, the operation of said second relay providing the disconnection of said ringing circuit from said station and further introducing through its operate time a time delay between the operation of said first relay and the operation of said second relay.

5. A ring trip arrangement as claimed in claim 2 wherein said capacitive means and said parallel connected windings which comprise said shunt circuit combinations provide a time constant of a duration in the order of three times the duration of each half cycle of said alternating current.

6. A ring trip arrangement of ringing circuit traversed by both alternating current and direct current and including a ring trip relay having an inoperative state when traversed by said alternating current and being operable to a tripped state when traversed by said direct current, the improvement comprising a pair of energizable relay windings for said ring trip relay, a pair of oppositely poled rectifying means connected in electrical series with said two windings, respectively, a pair of capacitive means connected in electrical series with said rectifying means, respectively, and in electrical parallel with said two windings, respectively, said capacitive means being alternately charged by said alternating current to sustantially equal and opposite charges for alternately impressing by means of unidirectional pulsating discharge currents substantially equal and opposite flux fields on said two windings, respectively, to provide said inoperative state by means of balanced flux fields, said balanced flux fields being removed when said direct current is established in said ringing circuit.

7. In a communication switching system having a ringing circuit traversed during ringing intervals by alternating current only and traversed when the ring is answered, by direct current as well, a ring trip arrangement comprising a ring trip relay having two windings, a pair of oppositely poled rectifying means and a pair of capacitive means, each of said two windings having a respective one of said capacitive means connected in shunt thereto to form a shunt combination, each of said two rectifying means being connected in series with a respective one of said two shunt combinations to form a series-shunt combination, said two series-shunt combinations being included in said ringing circuit in parallel relationship to each other, and said two shunt combinations having substantially equal electrical parameters and their time constants being such that, prior to answering, the pulsating unidirectional currents flowing in opposite directions through said two windings are, due to the storage action of said capacitive means, sufficiently balanced during each half cycle of said alternating current to keep said relay from operating whereas upon answering said balance is upset to cause said relay to operate and trip the ring.

* * * * *